(12) United States Patent
Williamson et al.

(10) Patent No.: US 6,307,499 B1
(45) Date of Patent: *Oct. 23, 2001

(54) METHOD FOR IMPROVING IR TRANSMISSIONS FROM A PC KEYBOARD

(75) Inventors: Ralph K. Williamson, Plano; Curtis L. Crisler, Cypress, both of TX (US)

(73) Assignee: Compaq Computer Corporation, Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/829,367

(22) Filed: Mar. 31, 1997

(51) Int. Cl.⁷ .......................... H04L 17/02; G08C 19/12
(52) U.S. Cl. .......................... 341/176; 341/22; 345/158; 359/142; 400/472
(58) Field of Search .................. 341/22, 31, 176; 345/166, 168, 170, 175, 158; 359/142, 146; 340/825.72; 400/472

(56) References Cited

U.S. PATENT DOCUMENTS

| | | | |
|---|---|---|---|
| 4,628,541 | 12/1986 | Beavers | 455/603 |
| 4,658,247 | 4/1987 | Gharachorloo | 340/747 |
| 4,775,928 | 10/1988 | Kendall et al. | 364/747 |
| 4,954,819 | 9/1990 | Watkins | 340/721 |
| 5,023,943 * | 6/1991 | Heberle | 359/146 |
| 5,220,580 * | 6/1993 | Heberle et al. | 359/146 |
| 5,243,430 * | 9/1993 | Emmons | 340/825.69 |
| 5,291,275 | 3/1994 | Lumelsky | 348/441 |
| 5,451,981 | 9/1995 | Drako et al. | 345/118 |
| 5,488,393 | 1/1996 | Wood et al. | 345/213 |
| 5,502,462 | 3/1996 | Mical et al. | 345/185 |
| 5,543,824 | 8/1996 | Priem et al. | 345/201 |
| 5,572,698 | 11/1996 | Yen et al. | 395/437 |
| 5,610,663 | 3/1997 | Nan et al. | 348/542 |
| 5,724,106 * | 3/1998 | Autry et al. | 341/176 |
| 5,796,387 * | 8/1998 | Curran et al. | 345/158 |
| 5,825,612 * | 10/1998 | Aubuchon et al. | 400/472 |

OTHER PUBLICATIONS

Phase–locked loop; NE/SE54/ Philips Semiconductors; Aug. 31, 1994; pp. 1–9.
Application Note/AN177; "An overview of the phase–locked loop (PLL"; Philips Semiconductors; Dec. 1988, pp. 1–6.
Application Note/AN179; "Circuit Description of the NE564"; Philips Semiconductors; Dec. 1991, pp. 1–6.
Application Note/AN180; "Frequency synthesis with the NE564"; Philips Semiconductors; Dec. 1988; pp. 1–3.
Application Note/AN182; "Clock regenerator with crystal–controlled phase–locked loop VCO (NE564)"; Philips Semiconductors; Dec. 1991; pp. 1–10.
"Gateway 2000 Sells Destination Big Screen PC Through Retail Chains", Internet article; Aug. 20, 1996; pp. 1–4.
"Gateway 2000 Launches Destination Big Screen PC Featuring 31–inch Monitor "; Internet article; Mar. 21, 1996; pp. 1–5.
" The Big Tube PCTV"; PC Online/ Trends Online; May 28, 1996; pp. 1–3.
"Destination Features"; Internet article, Aug. 21, 1996, pp. 1–5.
"Telefuzion"; Internet article; Mar. 12, 1997; pp. 1–2.
"High–Tech; Now you can tune your TV to the Internet"; Mike Snider; USA Today; Sep. 18, 1996; pp. 1–2.
Advanced Power Management (APM); Bios Interface Specification; Revision 1.1; Sep. 1993; pp. 1–59.

* cited by examiner

*Primary Examiner*—Timothy Edward, Jr.
(74) *Attorney, Agent, or Firm*—Sharp, Comfort & Merrett, P.C.

(57) ABSTRACT

A wireless communication device includes a housing, a user input device mounted in the housing, and a number of LEDs located so as to produce light from the housing, wherein at least two of the LEDs are located an appreciable distance apart from each other on the housing.

16 Claims, 4 Drawing Sheets

METHOD FOR IMPROVING IR TRANSMISSIONS FROM A PC KEYBOARD

BACKGROUND OF THE INVENTION

1. Field of the Invention

This invention relates generally to the field of wireless communication devices and to methods of improving the efficiency of transmission from such devices. More particularly, this invention is directed to devices which employ infare trnsmssion. An example of this type of device is a wireless keyboard for use with a personal computer.

2. Descripton of the Related Art

Various wireless keyboards and other remote control devices have been proposed by others. However, the degree of acceptance by the public of these devices has been limited in that the reliability of the "connection" between the remote, such as the keyboard, and the host (e.g., a computer) can at times be intermittent due to obstacles or incomplete communication from the remote to the host.

Wireless systems that employ an RF transmitter, such as is shown in Kendall et al.'s U.S. Pat. No. 4,775,928, suffer from various problems such as limited frequency bandwidth availability, interference, dead zones and the like.

Optical systems using a single LED as an infra-red driver, such as is shown in Lin et al.'s U.S. Pat. No. 5,189,543, suffer from other problems such as a possible intermittent light path to the receiver.

SUMMARY OF THE INVENTION

This invention solves the problem of intermittent connections between the remote and the host by a unique, novel and un-obvious use and placement of multiple IR (infra-red) transmitting elements on the remote unit.

This unique placement of the IR transmitters allow for a greater range of movement of the remote. This is very important when the remote device is a computer keyboard.

An additional advantage of this invention is that the remote may be operated at a greater angle from the host, due to wider dispersion and increased power density, thereby allowing a greater degree of flexibility for the user.

A further advantage is that the remote, especially when in the form of a keyboard, can be held in the lap of the user and still provide a high likelihood of a positive connection.

Yet another advantage is that the possible blocking of the signal, for example when the keyboard is in the user's lap, from the remote to the host is significantly reduced, in that the blocking of a single transmitter will still allow the transmission of the signals.

BRIEF DESCRIPTION OF THE DRAWINGS

Further advantages and features of the present invention can be best understood by reference to the following detailed description and to the drawings wherein.

DETAILED DESCRIPTION OF THE PREFERRED EXEMPLARY EMBODIMENTS OF THE PRESENT INVENTION

Figure 1:
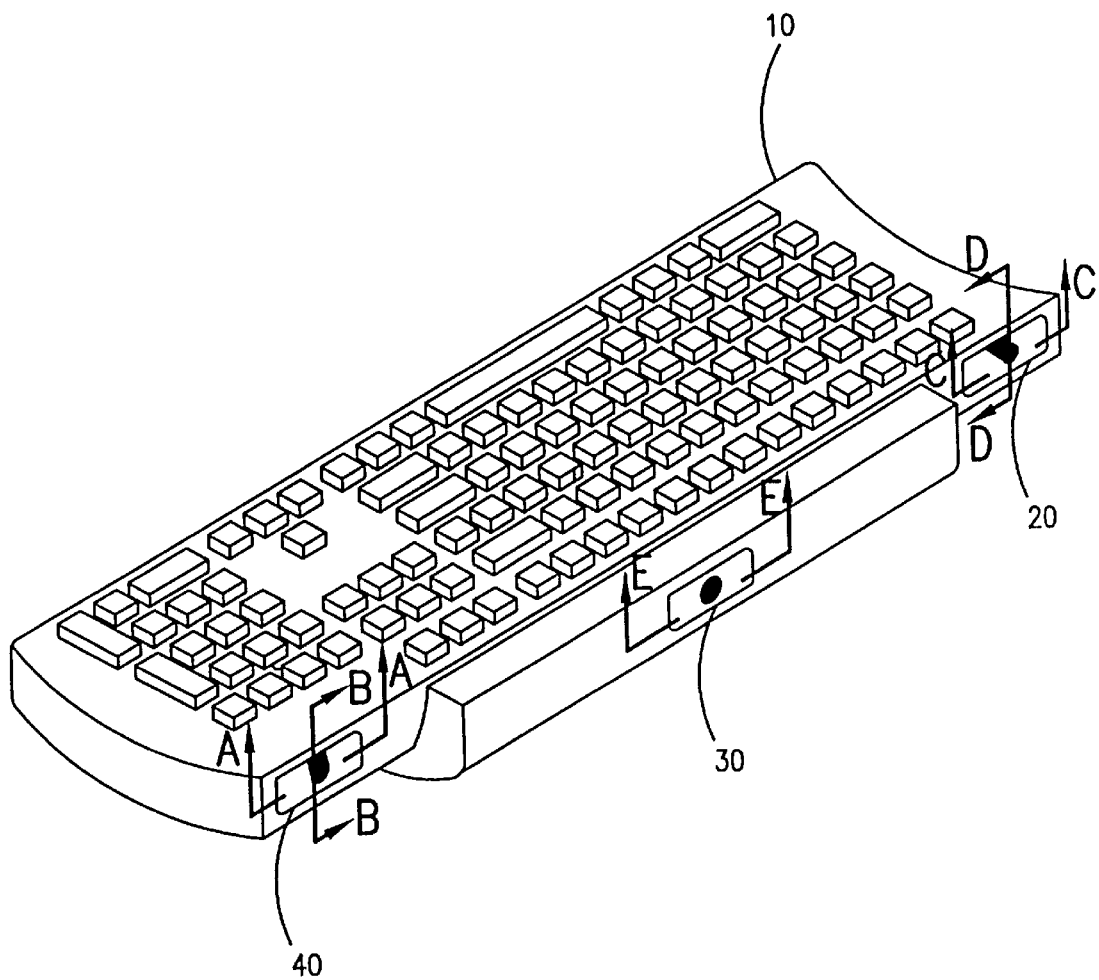
FIG. 1 is a plan view of the back side of an infra-red keyboard according to this invention.

As can be seen from FIG. 1, in a preferred embodiment three LEDs 20, 30 and 40 are employed in a remote control device such as a computer keyboard 10. Although three LED transmitters are shown, this invention will operate with any number greater than one LED transmitter. The specific circuit used to "drive" the LEDs 20, 30 and 40 can be one of the many conventional, known circuits. The description of this circuitry has been omitted for simplicity, however an example of the type of circuitry can be found in Lin et al.'s U.S. Pat. No. 5,189,543, and Beavers' U.S. Pat. No. 4,628,541, which are incorporated by reference herein.

The LED 30 is aligned such that the "central axis" of light propagation is perpendicular to the back of the keyboard in both the horizontal and vertical dimensions. That is to say that the center line of the LED's light generating direction is at about 90° from the back plane.

Figure 2:
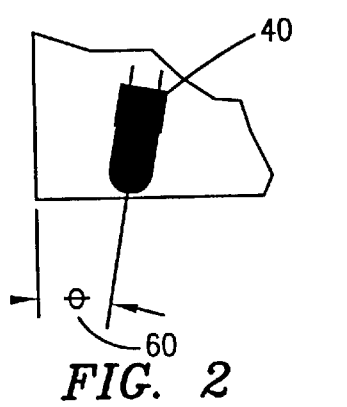
FIG. 2 is a partial cross section view of FIG. 1 taken along line B—B.
Figure 3:
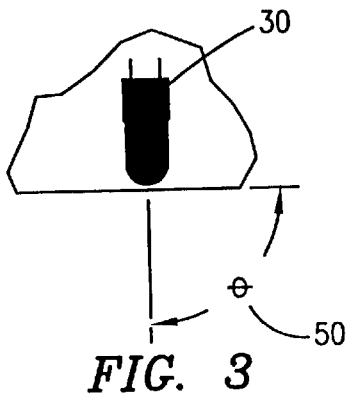
FIG. 3 is a partial cross section view of FIG. 1 taken along line E—E.
Figure 4:
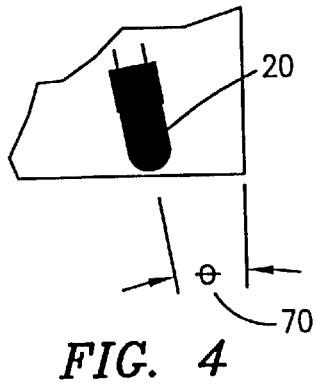
FIG. 4 is a partial cross section view of FIG. 1 taken along line D—D.
Figure 5:
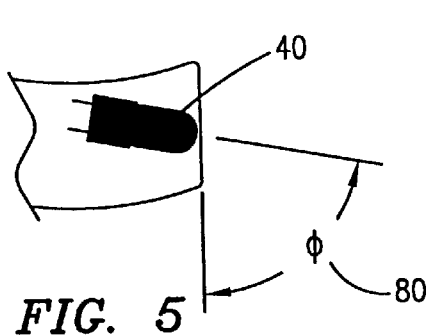
FIG. 5 is a partial cross section view of FIG. 1 taken along line A—A.
Figure 6:
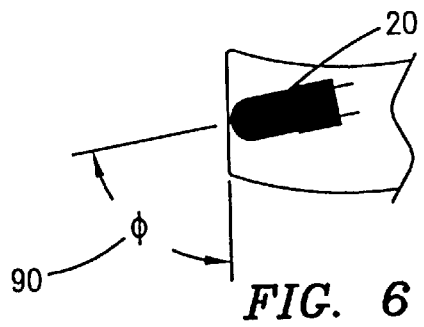
FIG. 6 is a partial cross section view of FIG. 1 taken along line C—C.

The two other LEDs 20 and 40 are displaced from LED 30 preferably and are also offset from the horizontal by an angle θ (70 and 60 respectively from FIGS. 4 and FIG. 2) and from the vertical by an angle Φ (90 and 80 from FIGS. 6 and 5 respectively). Although the angle Φ is shown to be identical for LEDs 20 and 40 in the Figures it need not be identical, nor does the angle θ have to be identical for the LEDs 20 and 40. The displacement of the LEDs 20 and 40 from the LED 30 is to cause a significantly different path for the IR energy to pass from the remote device to the host.

Ideally the angle Φ is about a 15° "down" angle from the back of the keyboard. The "center" LED 30 may also be angled "down" at an angle of 15°. The "down" angling of at least some of the multiple LEDs on the back section of the remote device facilitates the use of the remote device in the lap of a user as in this position the unit is often tilted "up" by the same or substantially the same amount as the "down" tilt of the LEDs. This allows for a "cancellation" effect to be present which allows for a more reliable connection between the remote and the host. As noted above the amount of down tilt between the LEDs (in this case three in number) does not have to be the same and in fact in some situations it may be advantageous to have a varying amount of down tilt. Also, the center LED 30 (assuming an odd number of them) need not be tilted, or it may be tilted a like amount as the other LEDs, or it may be down tilted a different amount.

The "sideways" tilt or aiming of the LEDs 20 and 40 likewise does not have to be the same. It has been determined, however, that an outside tilt with the angle θ being about 45° gives superior results. The center LED 30 in this case would not have any "tilt" or side-to-side angle. The up or down tilt of the center LED would not be effected by the selection of the sideways tilt. The selection of the sideways tilt of the other LEDs such as 20 and 40 is not necessarily effected by the down tilt and vice-versa.

By having this tilt both in, for example, both the horizontal and vertical planes from the central axis of propagation of light for the LED's 20, 30 and 40 from the back of the device, the light power outputted from the device may be increased (by virtue of plural devices to produce the light). Furthermore, the likelihood of a complete reception of signal increases as the angle of projection increases and multi-path reception of the IR transmission increases as a room in which this is being used becomes flooded with the light. Still further, the angling "down" of the LEDs 20 and 40 facilitates the use of the remote device which could be a computer keyboard in a persons lap, which is a likely use and location for a wireless keyboard.

Figure 7:
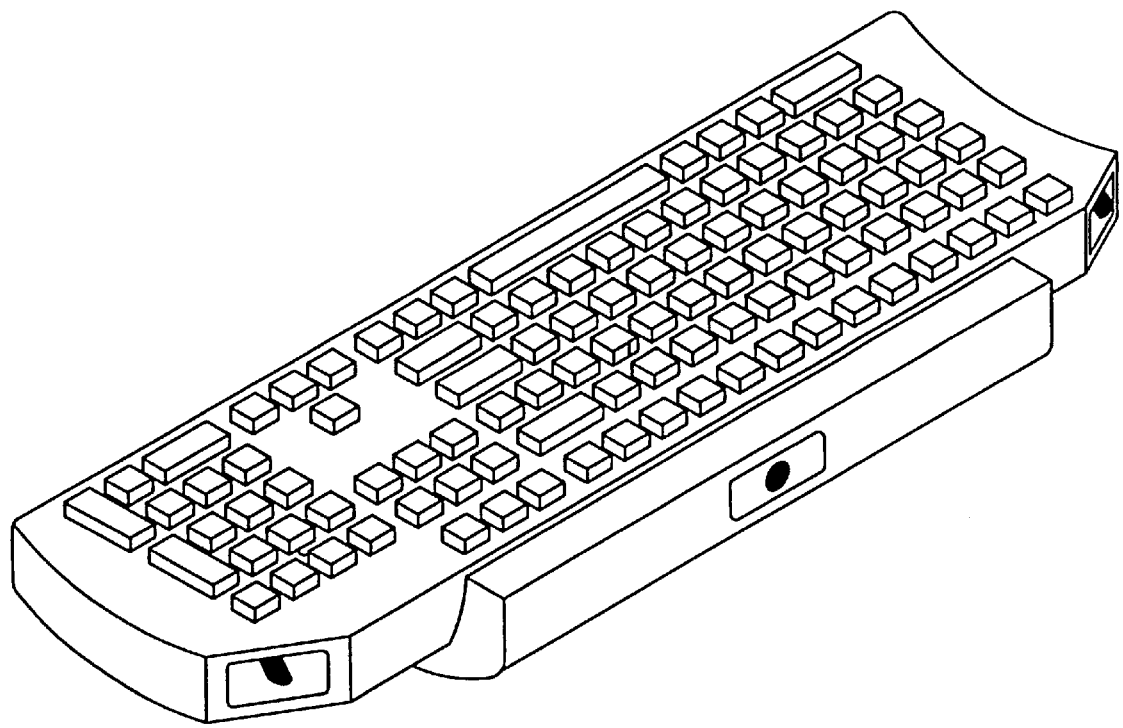
FIG. 7 is an alternate embodiment of this invention.
Figure 8:
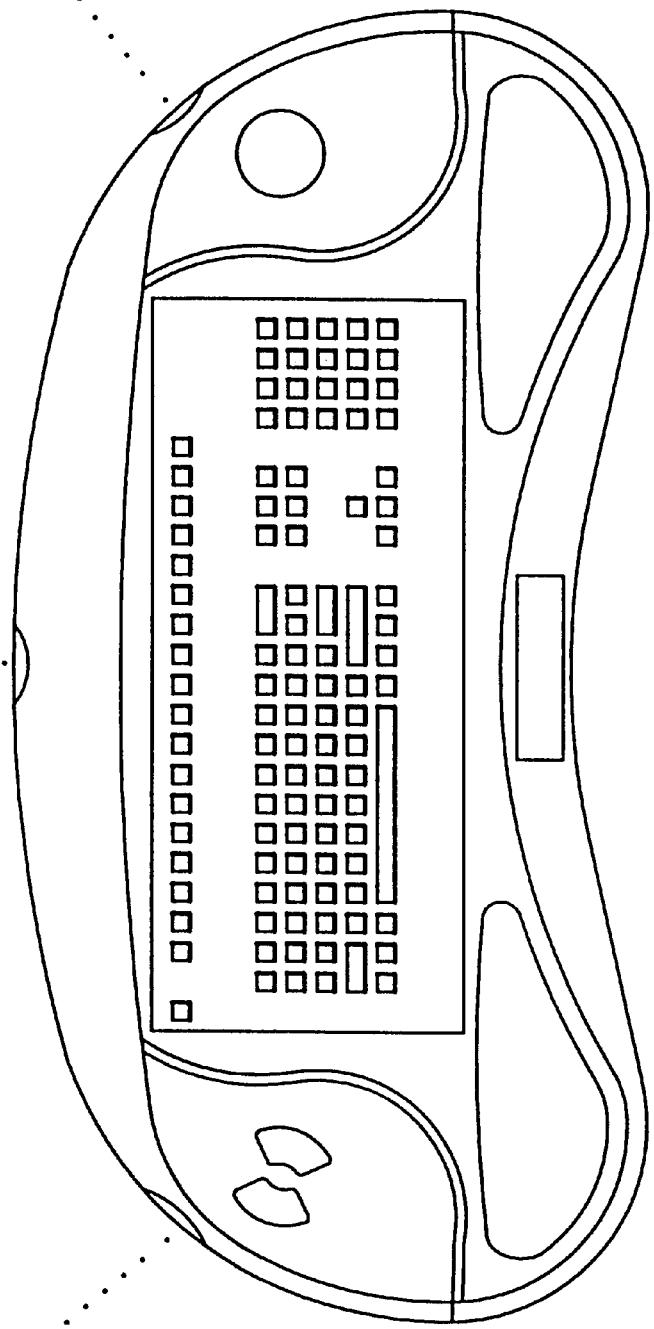
FIG. 8 is yet another alternate embodiment of this invention.

As can be seen from FIG. 7, the LED's 20 and 40 may be placed in angled holders or cutouts along the edge of the remote device or keyboard as well. In FIG. 8 it can be seen that the "back" edge of the remote device need not be flat but may be curved and the LED's 20 and 40 can be placed along a portion of the curve so that they are displaced from the central LED 30.

Based upon the foregoing, those skilled in the art should now understand and appreciate how embodiments of the present invention help ensure IR transmission comnmunication by increasing one or more of transmission strength, transmission paths, and range of acceptable angular displacement. Those skilled in the art should also now fully understand and appreciate how embodiments of the present invention can be used to construct an especially well designed remote keyboard (or other I/O device) for a computer system.

Although a few preferred embodiments of the invention have been shown and described, it will be appreciated by those skilled in the art that changes may be made in these embodiments without departing from the principles and the spirit of the invention, the scope of which is defined in the appended claims.

What is claimed is:

1. A wireless communication device comprising:
    a housing;
    said housing mounting plurality of spaced apart LEDs and
        a user input device comprising a computer keyboard including user operable input keys operable to cause each of said plurality of LEDs to emit a coded instruction characteristic of an operated key, said housing including a keyboard and a support surface, spaced apart elongated edge surfaces extending between said keyboard and said support surface, and spaced apart side edge surfaces extending between said keyboard and said support surface and between said elongated edge surfaces,
    each of the plurality of LEDs spaced apart along one of said elongated edge surfaces and located to produce and to direct light away from said one elongated edge surface of said housing along a unique central axis of light propagation;
    wherein at least two of said plurality of LEDs are angularly positioned with respect to said housing such that the central axis of light propagation associated with each of the at least two of said plurality of LEDs (a) divergent from each other and from said side edge surfaces, and (b) are inclined downwardly from said support surface when positioned horizontally.

2. A device as in claim 1 wherein each of said plurality of LEDs has a central axis of light propagation, and wherein the axes of at least two of said plurality of LEDs are not co-planar.

3. A device as in claim 1 wherein the light produced from said plurality of LEDs is in the infrared range.

4. A device as in claim 3 wherein the housing has a bottom surface and wherein the central axes of at least two of said plurality of LEDs is displaced downward about 15° from said bottom surface and about 45° from the central axis of a third of said plurality of LEDs; and wherein the third of said plurality of LEDs has a central axis parallel to said bottom surface of said housing.

5. A device as in claim 1 wherein said plurality of LEDs at least three in number.

6. A device as in claim 5 wherein each of said plurality LED has a central axis of light propagation and wherein the axes of at least two of said plurality of LEDs are not co-planar.

7. A device as in claim 6 wherein the housing has a bottom surface and wherein the central axes of at least two of said plurality of LEDs is displaced downward about 15° from said bottom surface.

8. A device as in claim 6 wherein the housing has a bottom surface and wherein the central axes of at least two of said plurality of LEDs is displaced downward about 15° from said bottom surface and wherein the central axes of said at least two of said plurality of LEDs are displaced about 45° from the central axis of a third of said plurality of LEDs.

9. A wireless communication device comprising:
    a housing comprising a computer keyboard and a support surface, spaced apart elongated edge surfaces extending between said keyboard and said support surface, and spaced apart side edge surfaces extending between said keyboard and said support surface and between said elongated edge surfaces;
    said housing mounting a plurality of LEDs spaced apart along one of said elongated edge surfaces, said computer keyboard including user operable input keys operable to cause each of said plurality of LEDs to emit a coded instruction characteristic of an operated key, each of the plurality of LEDs located to produce and to direct light away from said one elongated edge surface of said housing along a unique central axis of light propagation;
    wherein two of said plurality of LEDs are positioned on opposite sides of a third one of said plurality of LEDs along said one elongated edge surface, said two LEDs angularly positioned with respect to said housing such that the central axis of light propagation associated with each of said two LEDs (a) is divergent at an acute angle from a respective one of said side edge surfaces and (b) is inclined at an acute angle downward from said support surface when positioned horizontally.

10. A wireless communication device comprising:
    a housing comprising a computer keyboard and a support surface, spaced apart elongated edge surfaces extending between said keyboard and said support surface, and spaced apart side edge surfaces extending between said keyboard and said support surface and between said elongated edge surfaces;
    said housing mounting a plurality of LEDs spaced apart along one of said elongated edge surfaces, said computer keyboard including user operable input keys operable to cause each of said plurality of LEDs to emit a coded instruction characteristic of an operated key, each of the plurality of LEDs located to produce and to direct light away from said one elongated edge surface of said housing along a unique central axis of light propagation;
    wherein two of said plurality of LEDs are positioned near respective ones of said side edge surfaces on either side of a third one of said plurality of LEDs, such that with said support surface positioned horizontally, the central axes of light propagation associated with said two LEDs (a) are divergent from each other with respect to a vertical plane located between them, and (b) are inclined downwardly at an acute angle.

11. A device as claimed in claim 10, wherein said two LEDs are positioned at transitions between said one elongated edge surface and said side edge surfaces.

12. A device as claimed in claim 11, wherein said elongated edge surfaces and said side edge surfaces together define a curvilinear perimeter of said housing.

13. A wireless communication device comprising:

a housing comprising a computer keyboard and a support surface, spaced apart elongated edge surfaces extending between said keyboard and said support surface, and spaced apart side edge surfaces extending between said keyboard and said support surface and between said elongated edge surfaces;

said housing mounting a plurality of LEDs spaced apart along one of said elongated edge surfaces, said computer keyboard including user operable input keys operable to cause each of said plurality of LEDs to emit a coded instruction characteristic of an operated key, each of the plurality of LEDs located to produce and to direct light away from said one elongated edge surface of said housing along a unique central axis of light propagation;

wherein two of said plurality of LEDs are positioned near respective ones of said side edge surfaces on either side of a third one of said plurality of LEDs, such that the central axes of light propagation associated with said two LEDs (a) are divergent from each other and from the central axis of light propagation associated with the third LED to direct light outwardly of the respective side edge surfaces of the housing, and (b) are inclined downwardly at an acute angle when said support surface is positioned horizontally.

14. A device as claimed in claim 13, wherein said elongated edge surfaces and said side edge surfaces together define a curvilinear perimeter of said housing, and wherein said two LEDs are positioned at transitions between said one elongated edge surface and said side edge surfaces.

15. A wireless communication device comprising:

a housing comprising a computer keyboard and a support surface, spaced apart elongated edge surfaces extending between said keyboard and said support surface, and spaced apart side edge surfaces extending between said keyboard and said support surface and between said elongated edge surfaces;

said housing mounting a plurality of LEDs spaced apart along one of said elongated edge surfaces, said computer keyboard including user operable input keys operable to cause each of said plurality of LEDs to emit a coded instruction characteristic of an operated key; each of the plurality of LEDs located to produce and to direct light away from said one elongated edge surface of said housing along a unique central axis of light propagation;

wherein two of said plurality of LEDs are positioned near respective ones of said side edge surfaces on either side of a third one of said plurality of LEDs, such that the central axes of light propagation associated with said two LEDs (a) are divergent from each other and by and by an angle of about 45° from the central axis of light propagation associated with the third LED to direct light outwardly of the respective side edge surfaces of the housing, and (b) are inclined downwardly by an angle of about 15° when said support surface is positioned horizontally.

16. A device as claimed in claim 15, wherein said elongated edge surfaces and said side edge surfaces together define a curvilinear perimeter of said housing, and wherein said two LEDs are positioned at transitions between said one elongated edge surface and said side edge surfaces.

* * * * *